US012091137B1

United States Patent
Chen et al.

(10) Patent No.: US 12,091,137 B1
(45) Date of Patent: Sep. 17, 2024

(54) INTELLIGENT ASSISTANCE SYSTEM AND METHOD FOR BERTHING AND UNBERTHING BASED ON MULTI-TUGBOAT COLLABORATION

(71) Applicant: Wuhan University of Technology, Wuhan (CN)

(72) Inventors: Linying Chen, Wuhan (CN); Yamin Huang, Wuhan (CN); Pengfei Chen, Wuhan (CN); Jinhong He, Wuhan (CN); Mengxia Li, Wuhan (CN); Junmin Mou, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/657,211

(22) Filed: May 7, 2024

(30) Foreign Application Priority Data

May 30, 2023 (CN) .......................... 202310648184.1

(51) Int. Cl.
*B63B 21/56* (2006.01)
*B63B 79/40* (2020.01)

(52) U.S. Cl.
CPC .............. *B63B 21/56* (2013.01); *B63B 79/40* (2020.01); *B63B 2021/563* (2013.01)

(58) Field of Classification Search
CPC .... B63B 21/56; B63B 2021/563; B63B 79/40
See application file for complete search history.

(56) References Cited

U.S. PATENT DOCUMENTS

2023/0192262 A1* 6/2023 Sawada ................ G05D 1/0206 701/21

FOREIGN PATENT DOCUMENTS

| CN | 115258073 A | 11/2022 | |
|---|---|---|---|
| JP | 2021059225 A * | 4/2021 | ............. B63B 21/56 |
| WO | WO-2018004353 A1 * | 1/2018 | ............. B63B 21/56 |

OTHER PUBLICATIONS

Du Zhe et al., "Cooperative Multi-Agent Control for Autonomous Ship Towing Under Environmental Disturbances", Ieee-Caa Journal of Automatica Sinica, Jun. 17, 2021, pp. 1365-1379. vol. 8, No. 8.
(Continued)

*Primary Examiner* — Stephen P Avila
(74) *Attorney, Agent, or Firm* — Zhigang Ma

(57) ABSTRACT

An intelligent assistance system and a method for berthing and unberthing based on multi-tugboat collaboration are provided. The system includes an upper-level controller, a lower-level controller and a physical layer hardware module, the upper-level controller is used to process obtained ship data based on MPC algorithm, to obtain expected ship position, expected ship velocity, and environmental resistance information, and to process them based on the cost function to obtain expected trajectory and power of the tugboat; the lower-level controller communicates and connects with the upper-level controller to receive the upper-level controller, processes the expected trajectory, power, and environmental resistance information of the sent tugboat based on MPC algorithm to obtain working mode selection information, and receives control instructions sent by the upper-level controller and obtains propeller data information; the physical layer hardware module communicates with the lower-level controller to receive propeller data information and perform berthing and unberthing operations.

9 Claims, 5 Drawing Sheets

(56) References Cited

OTHER PUBLICATIONS

Du Zhe et al., "Multi-Objective Cooperative Control for a Ship-Towing System in Congested Water Traffic Environments", IEEE Transactions on Intelligent Transportation Systems, Sep. 28, 2022, pp. 24318-24329, vol. 23, No. 12.

Du Zhe et al., "COLREGS-Compliant collision avoidance for physically coupled multi-vessel systems with distributed MPC", Ocean Engineering, Sep. 15, 2022, vol. 260.

CNIPA, Notification of First Office Action for CN202310648184.1, Nov. 9, 2023.

Wuhan University of Technology (Applicant), Reply to Notification of First Office Action for CN202310648184.1, w/ (allowed) replacement claims, Mar. 20, 2024.

CNIPA, Notification to grant patent right for invention in CN202310648184.1, Mar. 22, 2024.

\* cited by examiner

INTELLIGENT ASSISTANCE SYSTEM AND METHOD FOR BERTHING AND UNBERTHING BASED ON MULTI-TUGBOAT COLLABORATION

FIELD OF THE DISCLOSURE

The disclosure relates to the technical field of port ships berthing and unberthing, as well as port operation tugboats, in particular to an intelligent assistance system and method for berthing and unberthing based on multi-tugboat collaboration.

BACKGROUND

Tugboats, also known as tugs, are often used to tow ships, assist large ships in entering and exiting ports and docks, or rescue ships in distress at sea. Compared to other ships, tugboats have the characteristics of small hull, sturdy structure, strong power, and flexible handling. Their operating area is relatively fixed, and the communication environment is stable. For most tugboats, their operating areas are mostly fixed in inland ports and nearshore waters, making the intelligence of tugboats better equipped. The intelligence of tugboats also contributes to the construction of smart ports. Therefore, intelligent tugboats have become a hot research direction for the development and application of intelligent ship technology.

The berthing and unberthing of port ships often require the assistance of multiple tugboats. Research has been conducted on the working methods of tugboats in ports both domestically and internationally, aiming to transfer the high demand control problem of one ship to the collaborative control problem of multiple intelligent tugboats. The operation of port tugboats can be divided into two working modes: "towing" and "pushing". For the multi-agent collaborative control problem of "pushing", only a few research works have proposed the optimization of this operating mode, and research on this operating mode is limited to static and non-marine environmental disturbance scenarios.

In the research on the collaborative control problem of multiple intelligent tugboats in the "towing" mode, people focus on making ships or unpowered facilities travel along a predetermined path, selecting the tugboat's pushing or towing working mode, and based on the tugboat's pushing or towing working mode, obtaining and sending control instructions to coordinate multiple tugboats and sending them, with a focus on the transportation of objects in collaborative floating. A multi-layer distributed control structure based on a specific collaborative structure for floating object cooperative transportation model is designed, which divides the transportation problem into multiple sub problems such as trajectory tracking, control allocation, and formation tracking, and sets them in different levels of controllers. MPC algorithm is used to solve the predictive control problem, and the multiplier (ADMM) method is used to solve the problem. Reached a hierarchical negotiation agreement, achieved intelligent collaborative transportation of ASV formations, and provided a solution for the transportation system of the proposed cooperative object; Zhe Du et al. proposed a multi-agent control algorithm under environmental interference (i.e., DU ZHE et al., "Cooperative Multi-Agent Control for Autonomous Ship Towing Under Environmental Disturbances", Ieee-Caa Journal of Automatica Sinica, Jun. 17, 2021, pp. 1365-1379. Vol. 8, No. 8.), which is applied to a specific towing system. By solving problems at different levels, the thruster force and torque required to resist environmental resistance in the towing system are obtained. By designing adaptive weights in the surrogate function, the stable operation of the towing system under environmental interference is ensured; Zhe Du proposed a multi-objective collaborative control method for ship towing systems in congested water traffic (i.e., DU ZHE et al., "Multi-Objective Cooperative Control for a Ship-Towing System in Congested Water Traffic Environments", Ieee Transactions on Intelligent Transportation Systems, Sep. 28, 2022, pp. 24318-24329, Vol. 23, No. 12. and DU ZHE et al., "COLREGS-Compliant collision avoidance for physically coupled multi-vessel systems with distributed MPC", Ocean Engineering, Sep. 15, 2022, Vol. 260.). By designing multiple control agents distributed in two control layers and based on model predictive control (MPC) strategy, the upper layer calculates the tugboat's towing force and torque, the lower layer calculates and outputs the tugboat's pushing force and torque, and uses the multiplier (ADMM) method to reach consensus between levels, achieving the goal of multi-agent collaborative control.

Based on the above research, most studies have only constructed a fixed combination of tugboat cooperation models for intelligent collaboration optimization of port operation tugboats. However, in ports with a large number of ship types and frequent ship entry and exit, different ship types need to be equipped with different types and quantities of tugboats, as well as service combination methods. A single and fixed tugboat cooperation method will not be able to meet the production and operation needs of the port.

SUMMARY

The purpose of this disclosure is to provide an intelligent assistance system and method for berthing and unberthing based on multi-tugboat collaboration to solve the technical problems of poor robustness, low safety, and incomplete coverage of tugboat working methods in existing intelligent collaboration methods for port operations.

To solve the above technical issues, this disclosure provides an intelligent assistance system for berthing and unberthing based on multi-tugboat collaboration, comprising:

an upper-level controller, which is used to process obtained ship data based on MPC algorithm, to obtain an expected ship position, an expected ship velocity, and environmental resistance information, to process the expected ship position and the expected ship velocity based on a cost function to obtain an expected trajectory and an expected tugboat power, to select working mode of the tugboat based on a work mode selection information, and to determine control instructions for coordinating multiple tugboats based on the working mode of the tugboat; the working mode of the tugboat comprises pushing or towing; the ship data comprise: expected stern position, ship velocity, obstacle position information, and wind resistance information; the tugboat power comprises: towing force or pushing force;

a lower-level controller, which is connected to the upper-level controller for receiving the expected trajectory, the tugboat power, and the environmental resistance information of the tugboat sent by the upper-level controller, for processing the expected trajectory, the tugboat power, and the environmental resistance information of the tugboat based on the MPC algorithm to obtain the work mode selection information, for sending the work mode selection information to the upper-level controller, for receiving the control instructions sent by the upper-level controller, and for obtaining data information of propeller based on the control instructions;

a physical layer hardware module, which is connected to the lower-level controller in communication for receiving data information of the propeller sent by the lower-level controller, and performing multi-tugboat collaborative berthing and unberthing operations based on the data information of the propeller;

wherein, in the pushing mode of the tugboat, obtained adaptive position weight coefficient and adaptive velocity weight coefficient are expressed as follows:

$$w_1 = \text{diag}(1,1,1), w_2 = \text{diag}(150,150,150);$$

where $w_1$ is the adaptive position weight, $w_2$ is the adaptive velocity weight;

in the towing mode of the tugboat, the obtained adaptive position weight coefficient and adaptive velocity weight coefficient are expressed as follows:

$$w_1 = \text{diag}(1, 1, 1);$$

$$w_2 = \text{diag}(w_u(t), w_v(t), w_r(t));$$

$$w_u(t) = w_v(t) = w_r(t) = k_0(1 + V_w(t))\left(\frac{d(t)}{d_0}\right);$$

$$d_0 = \sqrt{(x_{S_d} - x_{S_0})^2 - (y_{S_d} - y_{S_0})^2};$$

$$d(t) = \sqrt{(x_{S_d} - x_S(t))^2 - (y_{S_d} - y_S(t))^2};$$

$$w_{2t}(t) = \text{diag}(w_{ut}(t);$$

$$w_{ut}(t) = w_{vt}(t) = K_t\left[1 - \frac{V_w(t)}{V_w(t) + K_1}\right];$$

$$w_{rt}(t) = K_t\left[1 - \frac{V_w(t)}{V_w(t) + K_2}\right];$$

where $w_1$ is the adaptive position weight, $w_2$ is the adaptive velocity weight, $d_0$ is distance from initial position to the target point, $d(t)$ is distance from the current position to the target point, which is position error. $K_0$, $K_t$, $K_1$, and $K_2$ are represented as positive coefficients, $K_0$ and $K_t$ are initial and final values of the weight, and $w_{2t}(t)$ is the final value of the velocity weight;

wherein:

$$J_S(t) = e_{S_n}^T(t)w_1(t)e_{S_n}(t) + e_{S_v}^T(t)w_2(t)e_{S_v}(t);$$

$$e_{S_n}(t) = n_{S_c}(t) - n_{S_d};$$

$$e_{S_v}(t) = v_{S_c}(t) - v_{S_d};$$

where $J_S(t)$ is a minimum cost function, and angle formed between the required power and the ship to be served can be regarded as the minimum cost function. $e_{S_n}(t)$ and $e_{S_v}(t)$ are position error and velocity error, $w_1(t)$ and $w_2(t)$ are adaptive weights, and $n_{S_c}(t)$ and $v_{S_c}(t)$ are real-time ship position and velocity calculated through time discretization prediction, respectively.

Compared with existing technologies, the beneficial effect of this disclosure is: the upper-level controller of this disclosure mainly comprises a navigation reference device and a coordination controller. The lower-level controller mainly comprises multiple tugboat controllers to achieve trajectory tracking, control allocation, and formation tracking of the tugboat. By using MPC algorithm for predictive control solution, the upper-level controller calculates the ship's towing force and torque, while the lower-level controller calculates and outputs the tugboat's towing force and torque. In this process, this disclosure ensures the stable operation of the multi-tugboat collaborative berthing and unberthing intelligent auxiliary system under external environmental interference by using adaptive weights in the cost function. Finally, consensus is reached between the upper-level controller and the lower-level controller through a multiplier, achieving the goal of collaborative control of multiple intelligent tugboats. This disclosure solves the technical problems of poor robustness, low safety, and incomplete coverage of tugboat working methods in existing intelligent collaboration methods for port operations. This system is suitable for both pushing and towing modes of operation, and has good robustness. It can still maintain performance in harsh sea conditions, has high safety, and can also achieve remote control.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of the application.

This disclosure provides an intelligent assistance system and method for berthing and unberthing based on multi-tugboat collaboration, which are explained below.

Figure 1:
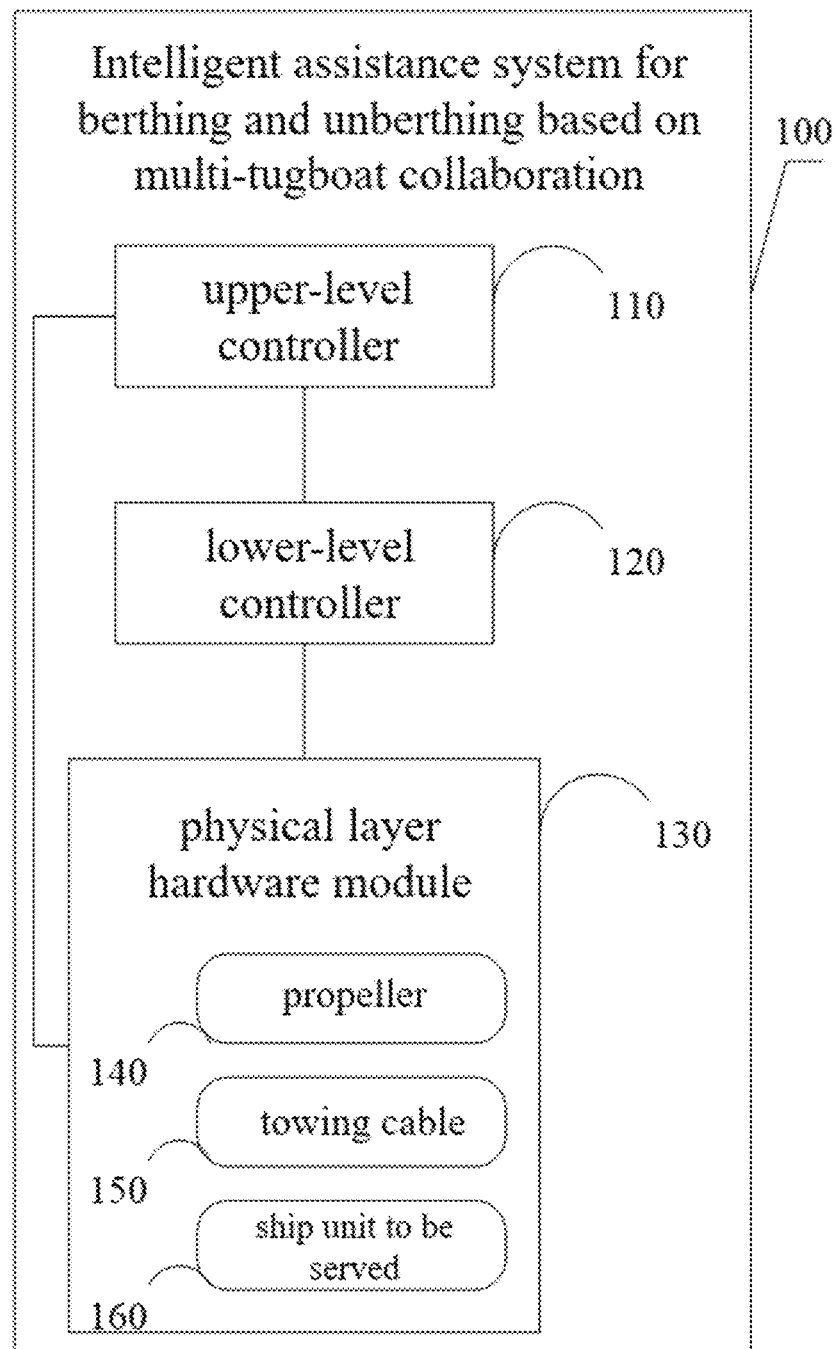
FIG. 1 is a system framework diagram of an embodiment of an intelligent assistance system for berthing and unberthing based on multi-tugboat collaboration provided by this disclosure.
Figure 2:
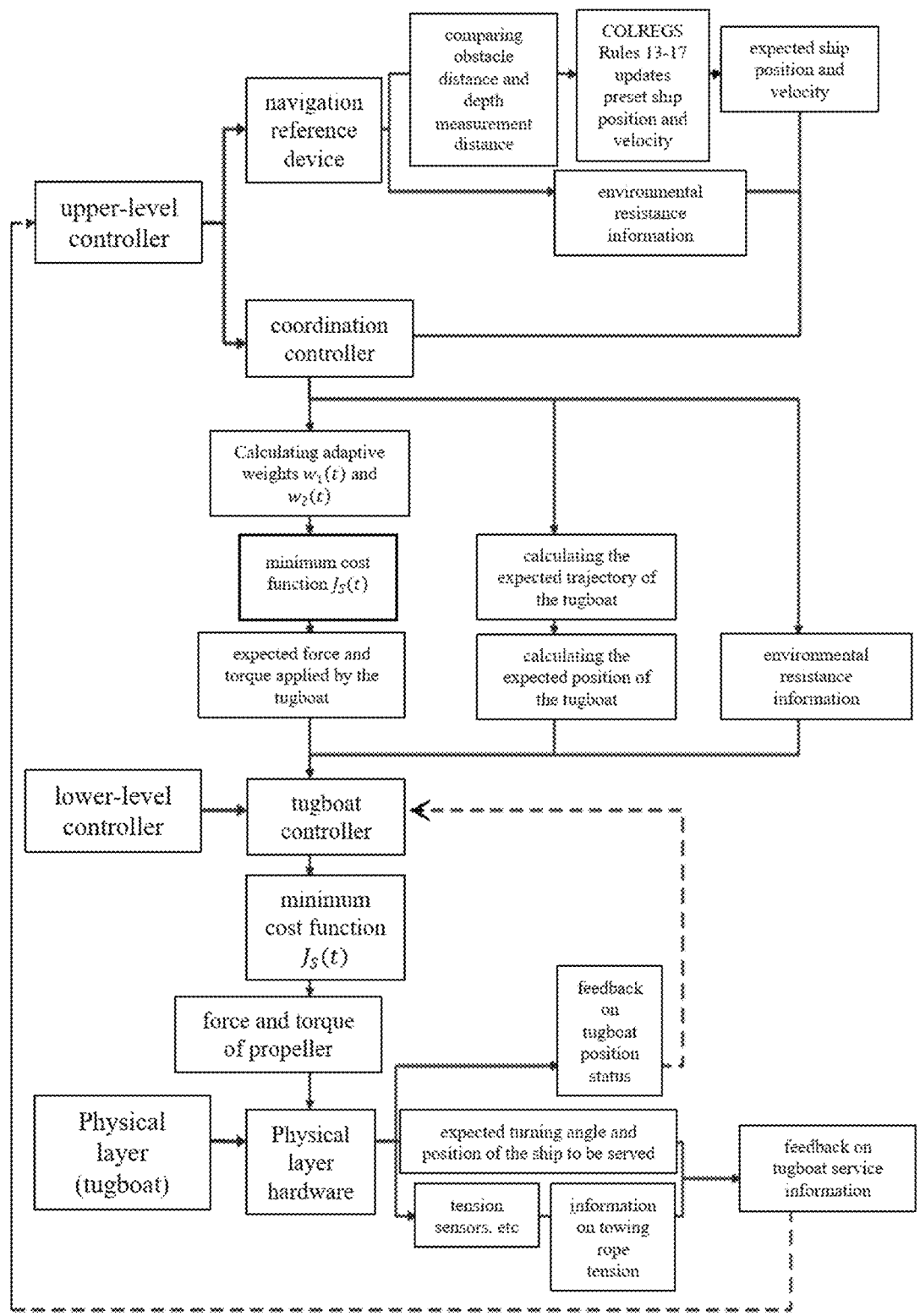
FIG. 2 is a system workflow diagram of an embodiment of an intelligent assistance system for berthing and unberthing based on multi-tugboat collaboration provided by this disclosure.

FIG. 1 is a system framework diagram of an embodiment of an intelligent assistance system for berthing and unberthing based on multi-tugboat collaboration provided by this disclosure. FIG. 2 is a system workflow diagram of an embodiment of an intelligent assistance system for berthing and unberthing based on multi-tugboat collaboration provided by this disclosure;

The intelligent assistance system for berthing and unberthing based on multi-tugboat collaboration comprises:

an upper-level controller 110, which is used to process obtained ship data based on MPC algorithm, to obtain an expected ship position, an expected ship velocity, and environmental resistance information, to process the expected ship position and the expected ship velocity based on a cost function to obtain an expected trajectory and an expected tugboat power, to select working mode of the tugboat based on a work mode selection information, and to determine control instructions for coordinating multiple tugboats based on the working mode of the tugboat; The working mode of the tugboat comprises pushing or towing; The ship data comprise: expected stern position, ship velocity, obstacle position information, and wind resistance information; the tugboat power comprises: towing force or pushing force;

a lower-level controller 120, which is connected to the upper-level controller 110 for receiving the expected trajectory, the tugboat power, and the environmental resistance information of the tugboat sent by the upper-level controller 110, for processing the expected trajectory, the tugboat power, and the environmental resistance information of the tugboat based on the MPC algorithm to obtain the work mode selection information, for sending the work mode selection information to the upper-level controller 110, for receiving the control instructions sent by the upper-level controller 110, and for obtaining data information of propeller 140 based on the control instructions;

a physical layer hardware module 130, which is connected to the lower-level controller 120 in communication for receiving data information of the propeller 140 sent by the lower-level controller 120, and performing multi-tugboat collaborative berthing and unberthing operations based on the data information of the propeller 140;

wherein, in the pushing mode of the tugboat, the obtained adaptive position weight coefficient and adaptive velocity weight coefficient are expressed as follows:

$$w_1 = \mathrm{diag}(1,1,1), w_2 = \mathrm{diag}(150,150,150);$$

where $w_1$ is the adaptive position weight, $w_2$ is the adaptive velocity weight;

In the towing mode of the tugboat, the obtained adaptive position weight coefficient and adaptive velocity weight coefficient are expressed as follows:

$$w_1 = \mathrm{diag}(1, 1, 1);$$

$$w_2 = \mathrm{diag}(w_u(t), w_v(t), w_r(t));$$

$$w_u(t) = w_v(t) = w_r(t) = k_0(1 + V_w(t))\left(\frac{d(t)}{d_0}\right);$$

$$d_0 = \sqrt{(x_{S_d} - x_{S_0})^2 - (y_{S_d} - y_{S_0})^2};$$

$$d(t) = \sqrt{(x_{S_d} - x_S(t))^2 - (y_{S_d} - y_S(t))^2};$$

$$w_{2t}(t) = \mathrm{diag}(w_{ut}(t));$$

$$w_{ut}(t) = w_{vt}(t) = K_t\left[1 - \frac{V_w(t)}{V_w(t) + K_1}\right];$$

$$w_{rt}(t) = K_t\left[1 - \frac{V_w(t)}{V_w(t) + K_2}\right];$$

where $w_1$ is the adaptive position weight, $w_2$ is the adaptive velocity weight, $d_0$ is the distance from the initial position to the target point, $d(t)$ is the distance from the current position to the target point, which is the position error. $K_0$, $K_t$, $K_1$, and $K_2$ are represented as positive coefficients, $K_0$ and $K_t$ are the initial and final values of the weight, and $w_{2t}(t)$ is the final value of the velocity weight;

wherein:

$$J_S(t) = e_{S_n}^T(t)w_1(t)e_{S_n}(t) + e_{S_v}^T(t)w_2(t)e_{S_v}(t);$$

$$e_{S_n}(t) = n_{S_c}(t) - n_{S_d};$$

$$e_{S_v}(t) = v_{S_c}(t) - v_{S_d};$$

where $J_S(t)$ is the minimum cost function, and the angle formed between the required power and the ship to be served can be regarded as the minimum cost function. $e_{S_n}(t)$ and $e_{S_v}(t)$ are position error and velocity error, $w_1(t)$ and $w_2(t)$ are adaptive weights, and $n_{S_c}(t)$ and $v_{S_c}(t)$ are real-time ship position and velocity calculated through time discretization prediction, respectively.

It can be understood that the upper-level controller of this disclosure mainly comprises a navigation reference device and a coordination controller. The lower-level controller mainly comprises multiple tugboat controllers to achieve trajectory tracking, control allocation, and formation tracking of the tugboat. By using MPC algorithm for predictive control solution, the upper-level controller 110 calculates the ship's towing force and torque, while the lower-level controller 120 calculates and outputs the tugboat's towing force and torque. In this process, this disclosure ensures the stable operation of the multi-tugboat collaborative berthing and unberthing intelligent auxiliary system under external environmental interference by using adaptive weights in the cost function. Finally, consensus is reached between the upper-level controller and the lower-level controller through a multiplier, achieving the goal of collaborative control of multiple intelligent tugboats. This disclosure solves the technical problems of poor robustness, low safety, and incomplete coverage of tugboat working methods in existing intelligent collaboration methods for port operations. It achieves two working modes, pushing and towing, and can maintain good performance in harsh sea conditions with high safety.

In some embodiments, the upper-level controller 110 comprises:

The upper-level controller 110 is used to obtain ship data, comprising: expected stern position, ship velocity, obstacle position information, and wind resistance information;

Furthermore, the upper-level controller 110 obtains expected stern position, ship velocity, obstacle position information, and wind resistance information by comparing detection distance and obstacle distance; where, $$\begin{cases} \eta_{S_d}(t) = \eta_{S_q}, & v_{S_d}(t) = v_{S_q} d_{ob}(t) > d_D \\ \eta_{S_d}(t) = \eta_{S_n}, & v_{S_d}(t) = v_{S_n} d_{ob}(t) \le d_D \end{cases};$$

$$d_{ob}(t) = \min\{d_{S_j}, d_{i_j}(t)\};$$

where $\eta_{S_d}(t)$ is the expected stern position, and $v_{S_d}(t)$ is the ship velocity, $\eta_{S_q}$ and $v_{S_q}$ are the predetermined heading positions and reference velocity for waypoint q, respectively, $\eta_{S_n}$ and $v_{S_n}$ represent the updated heading position and reference speed of waypoint q, respectively, $d_{S_j}$ represents distance between the ship to be served and the obstacle. $d_{i_j}(t)$ represents distance between the tugboat and the obstacle. Under towing working conditions, the tugboat and the ship to be served are considered as a whole, so the risk threshold for the obstacle should be the closest ship distance to the obstacle;

$$\eta_{S_n} = \begin{bmatrix} X_{S_n} \\ Y_{S_n} \\ \psi_{S_n} \end{bmatrix} = \begin{bmatrix} X_{S_{q-1}} \\ Y_{S_{q-1}} \\ \psi_{S_q} \end{bmatrix} + r \begin{bmatrix} \sin(\theta) \\ \cos(\theta) \\ \theta/r \end{bmatrix};$$

$$r = \left\| \begin{bmatrix} X_{S_{q-1}} \\ Y_{S_{q-1}} \end{bmatrix} - \begin{bmatrix} X_{S_q} \\ Y_{S_q} \end{bmatrix} \right\|_2;$$

where $\eta_{S_n}$ is the updated heading position of waypoint q, $X_{S_{q-1}}$ and $Y_{S_{q-1}}$ are the coordinates of the last waypoint q−1, $X_{S_q}$ and $Y_{S_q}$ are the coordinates of the current waypoint q, and r is the distance between the two waypoints mentioned above, $\psi_{S_q}$ is the predetermined heading along the current navigational direction; $\theta$ is the alternating angle, and $0° < \theta < \theta_{max}$, the lower boundary rotates clockwise and the upper boundary is defined according to spatial constraints ($\theta_{max}$=arctan(d(t)/l(t))), where l (t) is the distance between two waypoints, and d(t) is the minimum distance from the predefined waypoint path to the spatial edge;

$$V_{S_n} = \begin{bmatrix} u_{S_n} \\ v_{S_n} \\ r_{S_n} \end{bmatrix} = \begin{bmatrix} a_u & & \\ & 1 & \\ & & 1 \end{bmatrix} \begin{bmatrix} u_{S_q} \\ v_{S_q} \\ r_{S_q} \end{bmatrix};$$

where $V_{S_n}$ is the new reference velocity, $u_{S_n}$, $v_{S_n}$ and $r_{S_n}$ represent the current surge, sway, and yaw speed curves, respectively, and $a_u$ is the deceleration coefficient in the (0,1) range.

It can be understood that the upper-level controller 110 comprises a navigation reference device and a coordination controller. The navigation reference device is used to obtain ship data. In the towing mode, the tugboat and the served ship are considered as a whole. Therefore, the risk threshold for obstacles is the closest ship distance to the obstacle; The new heading position is calculated according to COLREGS Rules 13-17, which defines and operates the situations that a single ship may encounter, such as overtaking, head-on, and crossing. It describes the general actions that should be taken when making way for navigation, and indicates the actions that regular ships should take. The working modes of tugboats can be pushing and towing. In pushing mode, tugboats only need to push the ship for a certain period of time to provide turning force and torque for the ship to reach the preset waypoint, while the rest of the time is in a companion state. When encountering obstacles, they have a separate relationship with the ship to be served; For multiple ships in the towing mode, both the tugboats and the ship to be served are connected as a whole before berthing or unberthing, and when encountering obstacles, they need to turn as a whole. Therefore, the above rule operation can be equivalently transformed into using the clockwise change of the waypoint to calculate a new position and heading; The new reference speed is updated according to the COLREGS rules.

Furthermore, the upper-level controller 110 is used to adaptively weight the expected ship position data and expected ship velocity based on a cost function to obtain adaptive weight coefficients. The adaptive weight coefficients, expected ship position, and expected ship velocity are then processed by minimizing the cost function to obtain the expected trajectory and power of the tugboat;

wherein, in the pushing mode of the tugboat, the obtained adaptive position weight coefficient and adaptive velocity weight coefficient are expressed as follows:

$$w_1 = \text{diag}(1,1,1), w_2 = \text{diag}(150,150,150);$$

where $w_1$ is the adaptive position weight, $w_2$ is the adaptive velocity weight;

In the towing mode of the tugboat, the obtained adaptive position weight coefficient and adaptive velocity weight coefficient are expressed as follows:

$$w_1 = \text{diag}(1, 1, 1);$$

$$w_2 = \text{diag}(w_u(t), w_v(t), w_r(t));$$

$$w_u(t) = w_v(t) = w_r(t) = k_0(1 + V_w(t))\left(\frac{d(t)}{d_0}\right);$$

$$d_0 = \sqrt{(x_{S_d} - x_{S_0})^2 - (y_{S_d} - y_{S_0})^2};$$

$$d(t) = \sqrt{(x_{S_d} - x_S(t))^2 - (y_{S_d} - y_S(t))^2};$$

$$w_{2t}(t) = \text{diag}(w_{ut}(t));$$

$$w_{ut}(t) = w_{vt}(t) = K_t\left[1 - \frac{V_w(t)}{V_w(t) + K_1}\right];$$

$$w_{rt}(t) = K_t\left[1 - \frac{V_w(t)}{V_w(t) + K_2}\right];$$

where $w_1$ is the adaptive position weight, $w_2$ is the adaptive velocity weight, $d_0$ is the distance from the initial position to the target point, d(t) is the distance from the current position to the target point, which is the position error. $K_0$, $K_t$, $K_1$, and $K_2$ are represented as positive coefficients, $K_0$ and $K_t$ are the initial and final values of the weight, and $w_{2t}(t)$ is the final value of the velocity weight.

It can be understood that in this disclosure, the adaptive weights in the cost function are used to ensure the stable operation of the multi tugboat collaborative berthing and unberthing intelligent assistance system under external environmental interference. $K_0 > K_t > 1$, $K_1$ and $K_2$ respectively determine the final values of linear and angular velocity weights. Setting $0 < K_2 < K_1 < 1$ to strengthen velocity control of the ship at the end of the towing mode.

Furthermore, the ship unit to be served (i.e., the ship to be served) 160 is communicated and connected to the upper-level controller 110 for sending real-time ship position and real-time ship velocity to the upper-level controller 110;

The upper-level controller 110 is used to process the adaptive weight coefficients, the expected ship position, the expected ship velocity, the real-time ship position, and the real-time ship velocity based on minimizing the cost function to obtain the expected trajectory and power of the tugboat; where, $$J_S(t) = e_{S_n}^T(t) w_1(t) e_{S_n}(t) + e_{S_v}^T(t) w_2(t) e_{S_v}(t);$$

$$e_{S_n}(t) = n_{S_c}(t) - n_{S_d};$$

$$e_{S_v}(t) = v_{S_c}(t) - v_{S_d};$$

where, $J_S(t)$ is the minimum cost function, and the angle formed between the required power and the ship to be served can be regarded as the minimum cost function. $e_{S_n}(t)$ and $e_{S_v}(t)$ are position and velocity errors, $w_1(t)$ and $w_2(t)$ are adaptive weights, and $n_{S_c}(t)$ and $v_{S_c}(t)$ are the predicted ship position and velocity calculated through time discretization prediction, respectively;

$$n_{S_c}(k+1) = n_{S_c}(k) + \int_{kT_s}^{k+1T_s} R(\psi_s(t)) v_s dt;$$

$$v_{S_c}(k+1) = v_{S_c}(k) + \int_{kT_s}^{k+1T_s} M_S^{-1}[-C_S(v_s(t))*v_s(t) - D_S(v_s(t))*v_s(t) + \Sigma_{i=1}^n B_S(\alpha_i(t))*F_i(t)] dt;$$

where, $n_{S_c}(k+1)$ and $v_{S_c}(k+1)$ represent the predicted ship position and velocity calculated by discretizing the prediction at time k+1, respectively.

It can be understood that the minimum cost function is constrained by ship modeling and environmental resistance modeling functions.

Figure 3:
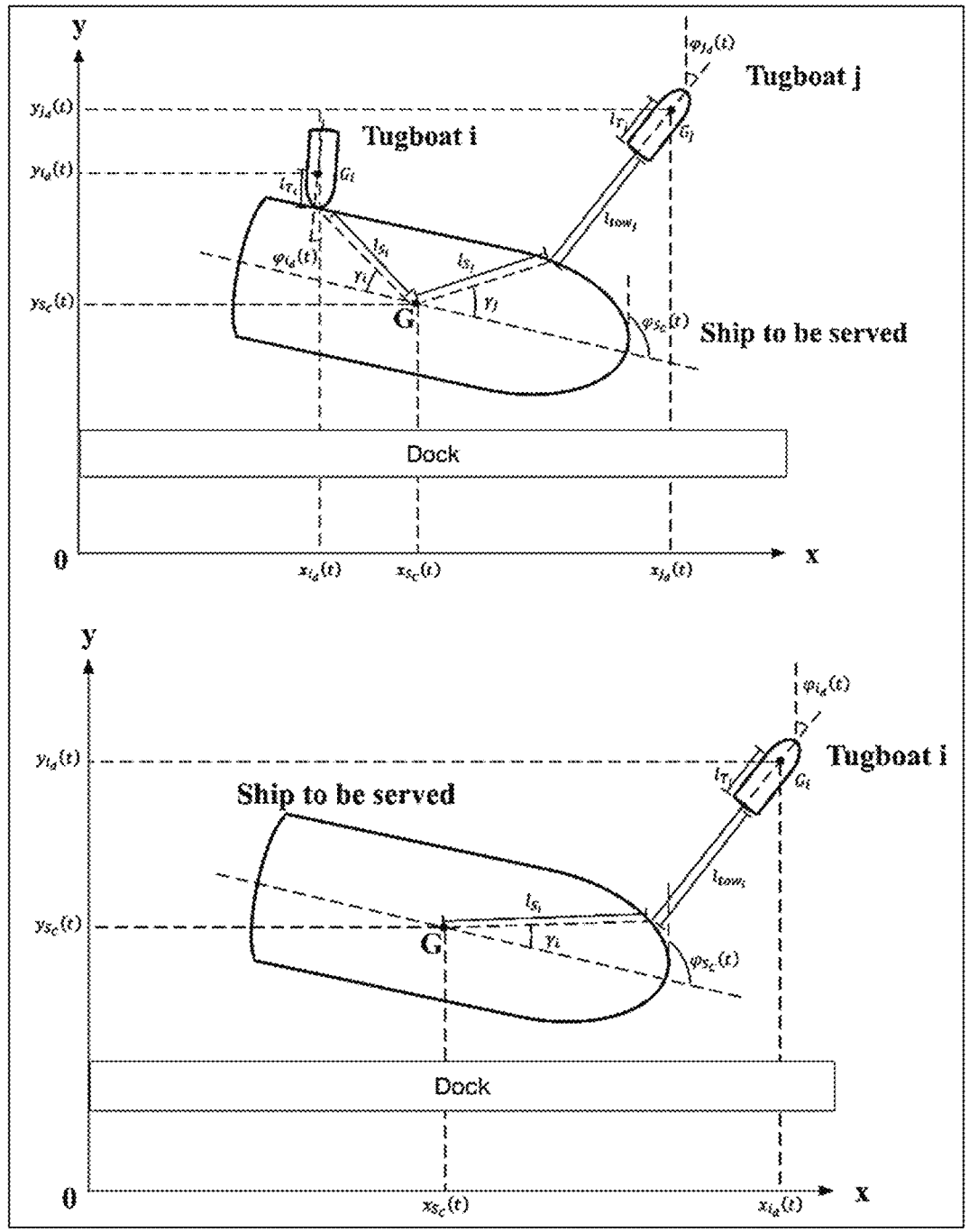
FIG. 3 is a berthing and unberthing model diagram of an embodiment of an intelligent assistance system for berthing and unberthing based on multi-tugboat collaboration provided by this disclosure.

FIG. 3 shows an embodiment of an intelligent assistance system for berthing and unberthing based on multi-tugboat collaboration provided by this disclosure, comprising:

$$\eta_{id}(t) = \eta_{S_c}(t) + (l_{tow_i} + l_{T_i}) E_i(\varphi_{S_c}(t), \alpha_i(t)) + l_{S_i} F_i(\varphi_{S_c}(t), \gamma_i) + \alpha_i(t)[0,0,1]^T;$$

where $\eta_{id}(t)$ is the expected trajectory of the tugboat, $l_{tow_i}$ is the expected elongation of the tug rope (in the working mode of the tugboat pushing, $l_{tow_i}=0$), and $l_{S_i}$ is the distance from the center of gravity of the ship to the towing or pushing point, $\gamma_i$ is the angle between the ship's heading and the direction from the ship's center of gravity to the towing or pushing point;

$$E_i = (-1)^{m_i} \begin{bmatrix} \sin(\varphi_{S_c}(t) + \alpha_i(t)) \\ \cos(\varphi_{S_c}(t) + \alpha_i(t)) \\ 0 \end{bmatrix};$$

$$F_i = (-1)^{m_i} \begin{bmatrix} \sin(\varphi_{S_c} + \gamma_i) \\ \cos(\varphi_{S_c} + \gamma_i) \\ 0 \end{bmatrix};$$

where, $E_i$ and $F_i$ are the vectors related to the predicted heading, towing angle, and pushing angle of the ship, respectively. When the tugboat is located behind the ship's center of gravity, $m_i=1$, and when the tugboat is located in front of the ship's center of gravity, $m_i=0$, the upper figure of FIG. 3 is the combined berthing model. The lower figure of FIG. 3 is the towing unberthing model.

It can be understood that the upper-level controller is installed on the ship to be served, and the lower-level controller is installed on the tugboat. Algorithm of the upper-level controller 110 is to calculate the adaptive weight coefficients by inputting the expected ship position and velocity, real-time ship position, real-time ship velocity, wind velocity, and wind angle. The power and force angle are calculated through the weight coefficients, and the expected trajectory of the tugboat is then calculated. Finally, the expected trajectory and power are obtained.

Furthermore, the upper-level controller 110 is communicated and connected to an external terminal, and is also used to receive and execute work instructions remotely sent by the external terminal.

It can be understood that the upper-level controller in the multi-tugboat collaborative berthing and unberthing intelligent assistance system proposed in this disclosure can be remotely controlled through external mobile terminals.

In some embodiments, the lower-level controller 120 is used to receive feedback information on the tugboat position status sent by the physical layer hardware module, and process the expected trajectory, the power, the environmental resistance information, and the tugboat position feedback information of the tugboat based on the MPC algorithm to obtain the work mode selection information.

Furthermore, the lower-level controller 120 is used to receive the control instructions sent by the upper-level controller 110, and process the expected trajectory, the power, the environmental resistance information, and the position feedback information of the tugboat to obtain data information of the propeller based on the control instructions and the cost function.

wherein, the data information of the propeller is obtained by calculating the force and torque of the propeller:

$$J_i(t) = e_{i_n}^T(t) e_{i_n}(t);$$

$$e_{i_n}(t)(t+1) = n_{i_c}(t) - n_{i_d}(t);$$

where $J_i(t)$ is the cost function, and $e_{i_n}(t)$ is the positional error;

$$n_{i_c}(k+1) = n_{i_c}(k) + \int_{kT_s}^{k+1T_s} R(\psi_i(t)) v_i dt;$$

$$\beta_i = \varphi_{i_d} - \varphi_i;$$

$$\tau_i \in [-\tau_{imax}, \tau_{imax}] (i=1,2);$$

where $n_{i_c}(k+1)$ is the tugboat position vector calculated using time k+1 discretization prediction, $\beta_i$ is the angle of the tugboat, $\varphi_{i_d}$ is the expected tugboat turning angle, $\varphi_i$ is the actual tugboat heading, $\tau_{imax}$ is the maximum value of the force and torque of the propeller, $\tau_i$ is the force and torque of the propeller;

It can be understood that the algorithm of the lower-level controller 120 is mainly based on inputting the expected trajectory of the tugboat, towing or pushing force, current tugboat position and velocity, wind velocity and wind angle, calculating the force and torque of the propeller, and finally outputting the force and torque of the propeller. The force and torque of the propeller satisfy saturation constraints.

Furthermore, the lower-level controller 120 is communicated and connected to an external terminal, and is also used to receive and execute instructions for the operation of the lower-level controller 120 remotely sent by the external terminal.

It can be understood that the lower-level controller in the multi-tugboat collaborative berthing and unberthing intelligent assistance system proposed in this disclosure can be remotely controlled through external mobile terminals.

In some embodiments, the physical layer hardware module 130 comprises a propeller 140 and a towing cable 150;
 the propeller 140 is used to receive data information sent by the lower-level controller 120 in the pushing mode of the tugboat, and to perform multi-tugboat collaborative berthing and unberthing operations based on the data information of the propeller 140;
 the towing cable 150 is used to receive data information from the lower-level controller 120 in towing mode, and to perform multi-tugboat collaborative berthing and unberthing operations based on the data information from the lower-level controller 120.

It can be understood that the physical layer hardware module 130 comprises all physical system components, specifically the propeller 140, the towing cable 150, tension sensors, and pressure sensors. The data information of the propeller 140 is mainly obtained by calculating the force and torque of the propeller 140.

Figure 4:
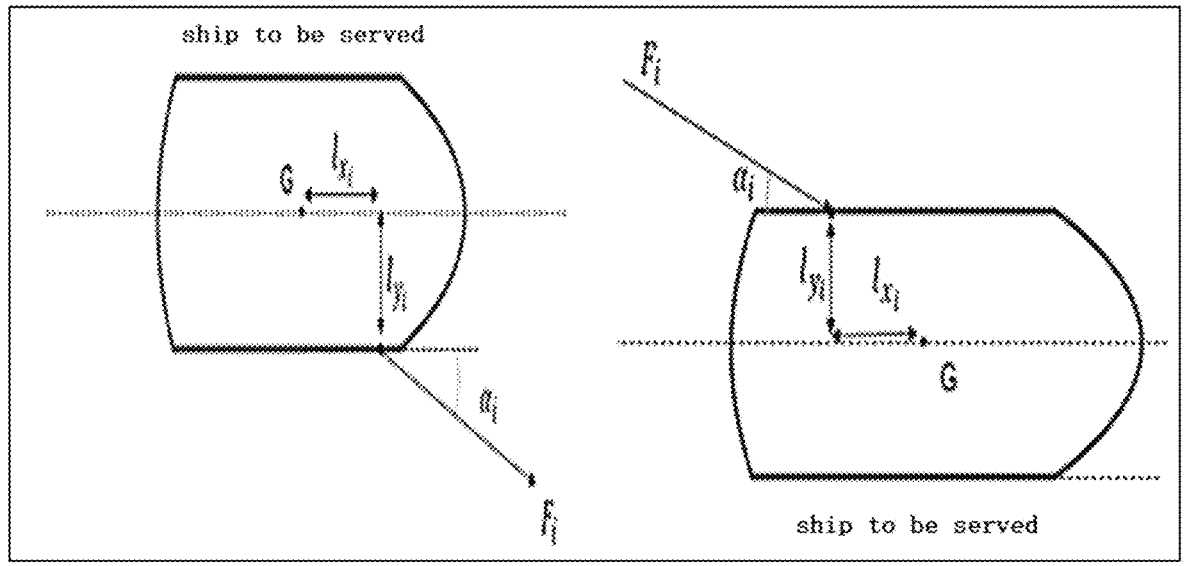
FIG. 4 shows a ship model diagram of an embodiment of an intelligent assistance system for berthing and unberthing based on multi-tugboat collaboration provided by this disclosure in the pushing or towing working mode.

FIG. 4 shows a ship model diagram of an embodiment of an intelligent assistance system for berthing and unberthing based on multi-tugboat collaboration provided by this disclosure in either pushing or towing mode, comprising:

The controllable input modeling for ship unit to be served 160 is as follows:

$$\tau_S(t) = \tau_0(t) + \sum_{i=1}^{n}[\tau_{S_i}(t)] = \sum_{i=1}^{n}[L_{S_i}(l_{x_i}, l_{y_i})B_{S_i}(\alpha_i(t))F_i(t);$$

$$L_{S_i} = \begin{bmatrix} 1 & 0 \\ 0 & 1 \\ l_{x_i} & l_{y_i} \end{bmatrix};$$

$$B_{S_i} = \begin{bmatrix} \cos(\alpha_i(t)) \\ \sin(\alpha_i(t)) \end{bmatrix};$$

where n represents the number of tugboats, $\tau_0(t)$ represents the force and torque provided by the self-power of the ship to be served, $\tau_{S_i}(t)$ represents the force and torque provided by the i-th tugboat, $L_{S_i}$ represents the force arm matrix related to the hull frame, and $B_{S_i}$ represents the configuration matrix related to the hull frame.

It can be understood that ship modeling can constrain the minimum cost function.

Figure 5:
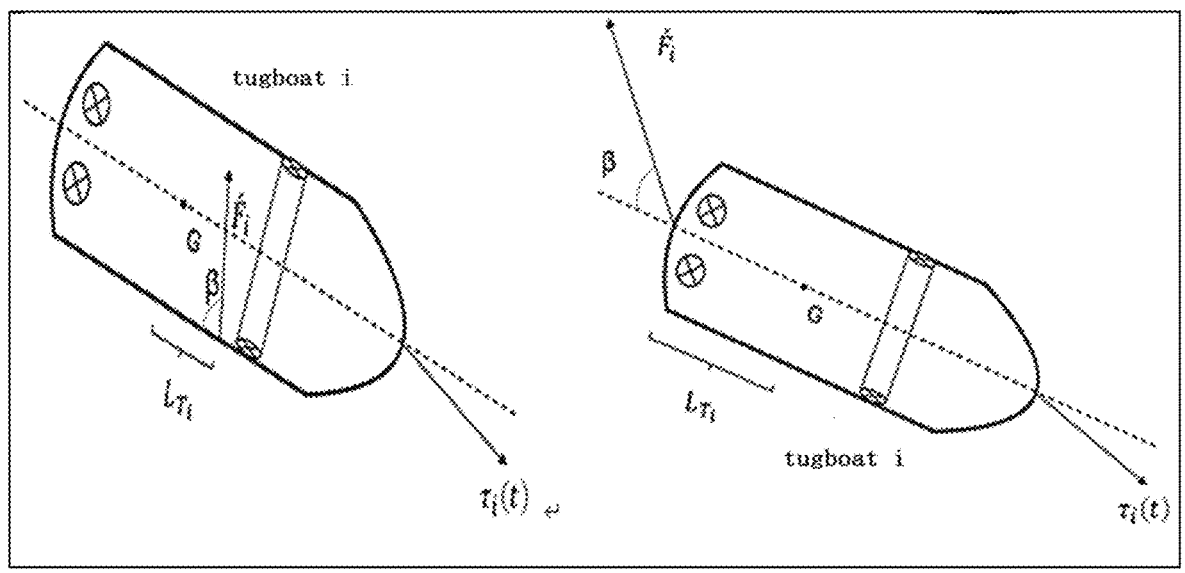
FIG. 5 shows a controllable input model diagram of an intelligent assistance system for berthing and unberthing based on multi-tugboat collaboration provided by this disclosure in the pushing or towing working mode.

FIG. 5 shows an embodiment of an intelligent assistance system for berthing and unberthing based on multi-tugboat collaboration provided by this disclosure, showing a controllable input model of a tugboat in pushing or towing working mode, comprising:

The controllable input modeling for the propeller 140 is as follows:

$$\tau_i(t) = \tau_{T_i}(t) + \tau_{F_i}(t);$$

where $\tau_{T_i}(t)$ represents the force and torque of the moving tugboat, $\tau_{F_i}(t)$ represents the force and torque compensating for the reaction force, which can be expressed as:

$$\tau_{F_i}(t) = L_{T_i}(l_{T_i})B_{T_i}(\beta_i(t))\acute{F}_i(t);$$

$$L_{T_i} = \begin{bmatrix} 1 & 0 \\ 0 & 1 \\ 0 & l_{T_i} \end{bmatrix};$$

$$B_{T_i} = \begin{bmatrix} \cos(\beta_i(t)) \\ \sin(\beta_i(t)) \end{bmatrix};$$

where $L_{T_i}$ is the force arm matrix related to the coordinate system of the tugboat hull, $B_{T_i}$ is the coordination matrix related to the main frame of the tugboat, and $\acute{F}_i(t)$ is the reaction force applied to the tugboat itself at the point of action. The left side of FIG. 5 shows the controllable input model of the tugboat in the pushing mode, and the right side of FIG. 5 shows the controllable input model of the tugboat in the towing mode;

Furthermore, the modeling of environmental resistance interference is as follows:

$$\tau_e(t) = \tau_w(t) + \tau_{cw}(t);$$

$$\tau_w(t) = \frac{1}{2}\rho_a V_{rw}^2(t)\begin{bmatrix} -c_x\cos(\gamma_{rw}(t))A_{Fw} \\ c_y\sin(\gamma_{rw}(t))A_{Lw} \\ c_n\sin(2\gamma_{rw}(t))A_{Lw}L_{oa} \end{bmatrix};$$

$$V_{rw}(t) = \sqrt{u_{rw}^2(t) + v_{rw}^2(t)};$$

$$\gamma_{rw}(t) = a\tan2(v_{rw}(t), u_{rw}(t));$$

$$u_{rw}(t) = u(t) - u_w(t);$$

$$v_{rw}(t) = v(t) - v_w(t);$$

$$u_w(t) = V_w(t)\cos(\beta_w(t) - \varphi(t));$$

$$v_w(t) = V_w(t)\sin(\beta_w(t) - \varphi(t));$$

where $\tau_e(t)$ is the environmental resistance, $\tau_w(t)$ is the wind effect, $\tau_{cw}(t)$ represents other unknown effects, $\rho_a$ is the air density; $c_x$, $c_y$ and $c_n$ are the horizontal motion coefficients of the wind; $A_{Fw}$ and $A_{Lw}$ are the transverse and transverse projected areas on the water surface; $L_{oa}$ is the total length of the hull; $\gamma_{rw}(t)$ and $V_{rw}(t)$ are the relative upwind angle and wind velocity related to the bow of the ship, respectively; $u_{rw}(t)$ and $v_{rw}(t)$ are the relative wind velocities in the x and y directions (hull frame), respectively; $u_w(t)$ and $v_w(t)$ are the related wind velocities in the x and y directions (in the Earth coordinate system), respectively.

It can be understood that the environmental resistance of ports is mainly dominated by wind resistance, so environmental disturbances are divided into wind effects and other unknown effects. Other unknown effects mainly refer to waves and ocean currents, and unknown effects are difficult to measure. The impact of wind disturbances on ships can be considered symmetrical relative to the xz and yz planes.

Figure 6:
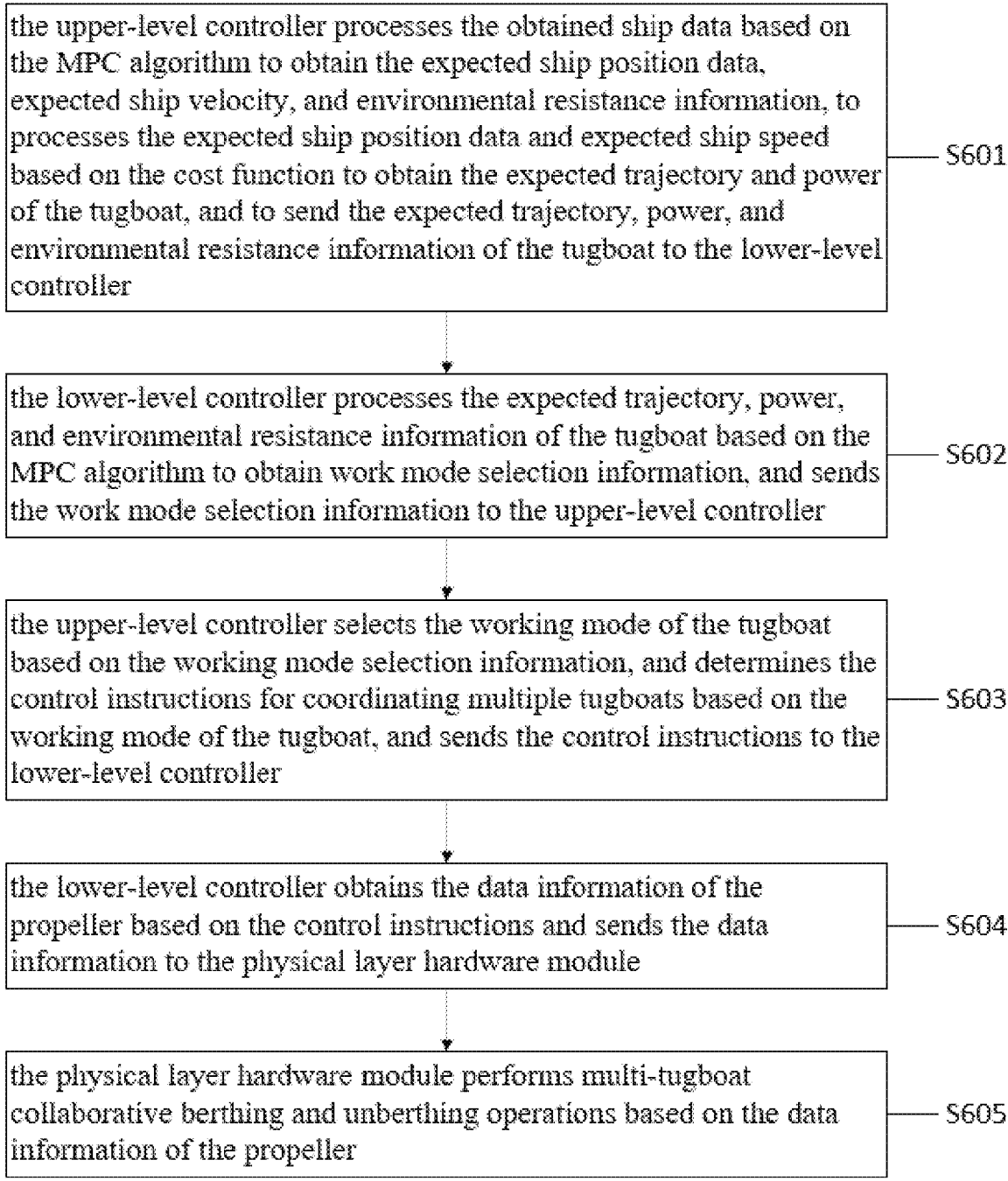
FIG. 6 is a method flowchart of an embodiment of an intelligent assistance system for berthing and unberthing based on multi-tugboat collaboration provided by this disclosure.

In addition, this disclosure also provides an embodiment of an intelligent berthing and unberthing assistance method based on multi-tugboat collaboration. Correspondingly, please refer to FIG. 6. FIG. 6 shows the method flowchart of an embodiment of an intelligent berthing and unberthing assistance method based on multi-tugboat collaboration provided by this disclosure, comprising:

The upper-level controller processes the obtained ship data based on the MPC algorithm to obtain the expected ship position data, expected ship velocity, and environmental resistance information, to processes the expected ship position data and expected ship speed based on the cost function to obtain the expected trajectory and power of the tugboat, and to send the expected trajectory, power, and environmental resistance information of the tugboat to the lower-level controller;

The lower-level controller processes the expected trajectory, power, and environmental resistance information of the tugboat based on the MPC algorithm to obtain work mode selection information, and sends the work mode selection information to the upper-level controller;

The upper-level controller selects the working mode of the tugboat based on the working mode selection information, and determines the control instructions for coordinating multiple tugboats based on the working mode of the tugboat, and sends the control instructions to the lower-level controller;

The lower-level controller obtains the data information of the propeller based on the control instructions and sends the data information to the physical layer hardware module;

The physical layer hardware module performs multi-tugboat collaborative berthing and unberthing operations based on the data information of the propeller.

This disclosure provides an intelligent assistance system and method for berthing and unberthing based on multi-tugboat collaboration, which solves the technical problems of poor robustness, low safety, and incomplete coverage of tugboat working modes in existing technologies. It realizes two working modes: pushing and towing, and can maintain performance in harsh sea conditions with high safety.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An intelligent assistance system for berthing and unberthing based on multi-tugboat collaboration, comprising:
   an upper-level controller, which is used to process obtained ship data based on model predictive control (MPC) algorithm, to obtain an expected ship position, an expected ship velocity, and environmental resistance information, to adaptively weight the expected ship position and the expected ship velocity based on a cost function to obtain adaptive weight coefficients, to process the adaptive weight coefficients, the expected ship position and the expected ship velocity through a minimum cost function to obtain an expected trajectory and expected tugboat power, to select a working mode of the tugboat based on work mode selection information, and to determine control instructions for coordinating multiple tugboats based on the working mode of the tugboat, wherein the working mode of the tugboat comprises a pushing mode or a towing mode, the ship data comprise: an expected stern position, a ship velocity, obstacle position information, and wind resistance information, and the expected tugboat power comprises: a towing force or a pushing force;
   a lower-level controller, which is connected to the upper-level controller for receiving the expected trajectory, the expected tugboat power, and the environmental resistance information of the tugboat sent by the upper-level controller, for processing the expected trajectory, the expected tugboat power, and the environmental resistance information of the tugboat based on the MPC algorithm to obtain the work mode selection information, for sending the work mode selection information to the upper-level controller, for receiving the control instructions sent by the upper-level controller, and for obtaining data information of a propeller based on the control instructions; and
   a physical layer hardware module, which is connected to the lower-level controller in communication for receiving the data information of the propeller sent by the lower-level controller, and performing multi-tugboat collaborative berthing and unberthing operations based on the data information of the propeller;
   wherein, in the pushing mode of the tugboat, an adaptive position weight coefficient and an adaptive velocity weight coefficient of the adaptive weight coefficients are expressed as follows:

$$w_1 = \text{diag}(1,1,1), w_2 = \text{diag}(150,150,150);$$

where $w_1$ is an adaptive position weight, $w_2$ is an adaptive velocity weight;
   in the towing mode of the tugboat, the adaptive position weight coefficient and the adaptive velocity weight coefficient are expressed as follows:

$$w_1 = \text{diag}(1, 1, 1);$$
   $$w_2 = \text{diag}(w_u(t), w_v(t), w_r(t));$$
   $$w_u(t) = w_v(t) = w_r(t) = k_0(1 + V_w(t))\left(\frac{d(t)}{d_0}\right);$$
   $$d_0 = \sqrt{(x_{S_d} - x_{S_0})^2 - (y_{S_d} - y_{S_0})^2};$$
   $$d(t) = \sqrt{(x_{S_d} - x_S(t))^2 - (y_{S_d} - y_S(t))^2};$$
   $$w_{2t}(t) = \text{diag}(w_{ut}(t));$$
   $$w_{ut}(t) = w_{vt}(t) = K_t\left[1 - \frac{V_w(t)}{V_w(t) + K_1}\right];$$
   $$w_{rt}(t) = K_t\left[1 - \frac{V_w(t)}{V_w(t) + K_2}\right];$$

where $w_1$ is the adaptive position weight, $w_2$ is the adaptive velocity weight, $d_0$ is a distance from an initial position to a target point, $d(t)$ is a distance from a current position to the target point, which is a position error, $K_0$, $K_t$, $K_1$, and $K_2$ are represented as positive coefficients, $K_0$ and $K_t$ are an initial value and a final value of weights respectively, and $w_{2t}(t)$ is the final value of the velocity weight;
   wherein:

$$J_S(t) = e_{S_n}^T(t)w_1(t)e_{S_n}(t) + e_{S_v}^T(t)w_2(t)e_{S_v}(t);$$
   $$e_{S_n}(t) = n_{S_c}(t) - n_{S_d};$$
   $$e_{S_v}(t) = v_{S_c}(t) - v_{S_d};$$

where $J_S(t)$ is the minimum cost function, and an angle formed between required power and a ship to be served can be regarded as the minimum cost function, $e_{S_n}(t)$ and $e_{S_v}(t)$ are a position error and a velocity error respectively, $w_1(t)$ and $w_2(t)$ are adaptive weights, and $n_{S_c}(t)$ and $v_{S_c}(t)$ are a real-time ship position and a real-time ship velocity calculated through time discretization prediction, respectively.

2. The intelligent assistance system for berthing and unberthing based on the multi-tugboat collaboration according to claim 1, wherein the physical layer hardware module further comprises a ship unit to be served;
   wherein the ship unit to be served is communicated and connected to the upper-level controller for sending the real-time ship position and the real-time ship velocity to the upper-level controller;
   wherein the upper-level controller is used to process the adaptive weight coefficients, the expected ship position, the expected ship velocity, the real-time ship position, and the real-time ship velocity based on the minimum cost function to obtain the expected trajectory of the tugboat and the expected tugboat power.

3. The intelligent assistance system for berthing and unberthing based on the multi-tugboat collaboration according to claim 1, wherein the lower-level controller is used to receive feedback information on tugboat position status sent by the physical layer hardware module, and process the expected trajectory, the expected tugboat power, the environmental resistance information, and the feedback information on the tugboat position status based on the MPC algorithm to obtain the work mode selection information.

4. The intelligent assistance system for berthing and unberthing based on the multi-tugboat collaboration according to claim 3, wherein the lower-level controller is used to receive the control instructions sent by the upper-level controller, and process the expected trajectory, the expected tugboat power, the environmental resistance information, and the feedback information on the tugboat position status to obtain the data information of the propeller based on the control instructions and the cost function.

5. The intelligent assistance system for berthing and unberthing based on the multi-tugboat collaboration according to claim 1, wherein the physical layer hardware module comprises the propeller and a towing cable;
wherein the propeller is used to receive the data information of the propeller sent by the lower-level controller in the pushing mode of the tugboat, and to perform the multi-tugboat collaborative berthing and unberthing operations based on the data information of the propeller;
wherein the towing cable is used to receive the data information of the propeller sent by the lower-level controller in the towing mode, and to perform the multi-tugboat collaborative berthing and unberthing operations based on the data information of the propeller.

6. The intelligent assistance system for berthing and unberthing based on the multi-tugboat collaboration according to claim 1, wherein the upper-level controller is communicated and connected to an external terminal, and is also used to receive and execute work instructions of the upper-level controller remotely sent by the external terminal.

7. The intelligent assistance system for berthing and unberthing based on the multi-tugboat collaboration according to claim 1, wherein the lower-level controller is communicated and connected to an external terminal, and is also used to receive and execute instructions for operations of the lower-level controller remotely sent by the external terminal.

8. The intelligent assistance system for berthing and unberthing based on the multi-tugboat collaboration according to claim 1, wherein the upper-level controller is installed on the ship to be served, and the lower-level controller is installed on the tugboat.

9. An intelligent assistance method for berthing and unberthing based on multi-tugboat collaboration, wherein the method is applied in the intelligent assistance system for berthing and unberthing based on the multi-tugboat collaboration according to claim 1, the method comprises:
processing, by the upper-level controller, the obtained ship data based on the MPC algorithm to obtain the expected ship position, the expected ship velocity, and the environmental resistance information, processing, by the upper-level controller, the expected ship position and the expected ship velocity based on the cost function to obtain the expected trajectory and power of the tugboat, and sending, by the upper-level controller, the expected trajectory, the expected tugboat power, and the environmental resistance information of the tugboat to the lower-level controller;
processing, by the lower-level controller, the expected trajectory, the expected tugboat power, and the environmental resistance information of the tugboat based on the MPC algorithm to obtain the work mode selection information, and sending, by the lower-level controller, the work mode selection information to the upper-level controller;
selecting, by the upper-level controller, the working mode of the tugboat based on the working mode selection information, and determining, by the upper-level controller, the control instructions for coordinating the multiple tugboats based on the working mode of the tugboat, and sending, by the upper-level controller, the control instructions to the lower-level controller;
obtaining, by the lower-level controller, the data information of the propeller based on the control instructions and sending, by the lower-level controller, the data information to the physical layer hardware module; and
performing, by the physical layer hardware module, the multi-tugboat collaborative berthing and unberthing operations based on the data information of the propeller.

* * * * *